United States Patent [19]

Charters

[11] Patent Number: 4,821,365
[45] Date of Patent: Apr. 18, 1989

[54] DUST REMOVAL ATTACHMENT

[76] Inventor: William E. Charters, 41034 Cornac Ter., Fremont, Calif. 94539

[21] Appl. No.: 86,779

[22] Filed: Aug. 19, 1987

[51] Int. Cl.⁴ .............................................. B27B 11/02
[52] U.S. Cl. ........................................ 15/339; 51/273; 144/252 R
[58] Field of Search ......................... 15/339; 51/273 X; 144/252 R, 252 A; 29/DIG. 84, DIG. 86

[56] References Cited

U.S. PATENT DOCUMENTS

| | | | |
|---|---|---|---|
| 3,022,806 | 2/1962 | Johnston | 144/252 R |
| 3,786,846 | 1/1974 | Mehring | 51/273 |
| 4,088,164 | 5/1978 | McCord, Jr. | 51/273 |
| 4,090,297 | 5/1978 | Wanner et al. | 51/273 |
| 4,606,685 | 8/1986 | Maier et al. | 51/273 |

Primary Examiner—Harvey C. Hornsby
Assistant Examiner—Corinne M. Reinckens
Attorney, Agent, or Firm—Leon Gilden

[57] ABSTRACT

A dust removal attachment for a router has a diamond shaped base plate having a circular central aperture through which the spindle of the router extends during use. A vacuum connection fitting and a handle extend upwardly from opposite ends of the top surface of the base plate. A brush, having bristles arranged in a partial circular arc which surrounds a portion of the circular central opening, is attached by a mounting flange to the bottom surface of the base plate. The brush has a concave body portion which forms a vacuum passage which communicates with the vacuum connection on the top surface of the base plate. In use, chips and dust created by the router bit are contained by the brush and suctioned off through the vacuum connection.

12 Claims, 3 Drawing Sheets

DUST REMOVAL ATTACHMENT

BACKGROUND OF THE INVENTION

1. Field of the Invention

The present invention relates to dust removal attachments, and more particularly pertains to a new and improved dust removal attachment for use with a router. As is well known to those of ordinary skill in the art, woodworking tools in general create chips and dust during use. Routers, in particular, create a large volume of dust and chips due to the high speed at which the spindle of a router rotates during use, and due also to the large volumes of material which are removed in typical router operations. The dust and chips created during use of a router create several problems. First of all, the work area is obscured and the router operator must waste time in frequently clearing the work area in order to maintain an adequate view of the workpiece. Secondly, the scattering of dust and chips throughout the work shop necessitates frequent cleaning of the shop. If the router is being used in a home, the furnishings may be soiled by the dust and chips produced. A third problem is created by the very fine dust particles produced during router operation. These very fine particles are suspended in the air of the work area and are inhaled by individuals in the shop. Long term exposure to this fine dust by workers can cause severe and chronic respiratory illness. OSHA has therefore set standards for the control of dust in the workplace. Simple dust masks are inadequate to protect workers from this fine dust, and large and cumbersome masks must be utilized to ensure adequate filtration of air inhaled by the workers. Thus, it can be seen that there is a need for a device to efficiently collect the dust and chips created during the use of a router.

2. Description of the Prior Art

Various types of dust removal attachments are known in the prior art. A typical example of such a dust removal attachment is to be found in U.S. Pat. No. 4,296,572, which issued to P. Quintana on Oct. 27, 1981, and discloses a dust removal attachment for a reciprocating file. This device utilizes a portion of the pressurized air being supplied to the pneumatic file motor to entrain dust particles and to blow them into a collection bag. U.S. Pat. No. 4,549,371, which issued to K. Hakoda on Oct. 29, 1985, discloses a dust collecting assembly for a reciprocating sander which is driven by a rotary spindle. A fan located in a chamber coaxial with the spindle of the sander draws dust from the workpiece through passages in the sanding platen. U.S. Pat. No. 4,531,329, which issued to P. Huber on July 30, 1985, discloses an exhaust shroud for mounting on the casing of a portable pneumatic sanding machine. A resiliently deformable sealing lip engages a surface of the workpiece and communicates with a vacuum passage. A vacuum induced by the exhaust air from the sanding machine motor suctions dust generated by a sanding operation into the shroud and through the vacuum passage. U.S. Pat. No. 4,589,231, which issued to T. Roberts on May 20, 1986, discloses a dust removal attachment for a lens generating machine. A cylindrical housing which surrounds the work area is connected to a vacuum source. U.S. Pat. No. 4,598,500, which issued to J. Faraudo et al on July 8, 1986, discloses a dust removal attachment for a reciprocating power sander. A housing which surrounds the entire sanding machine has a fitting for connection to a vacuum source. U.S. Pat. No. 4,606,685, which issued to P. Maier et al on Aug. 19, 1986, discloses a router with provisions for dust exhaust. A housing connected to a vacuum passage surrounds the router spindle and suctions swarf from the work area. U.S. Pat. No. 4,616,449, which issued to M. Marton on Oct. 14, 1986, discloses a dust removal attachment for portable sanders. A flexible skirt forms a vacuum passage for the exhaust of swarf which is drawn through apertures in the sanding platen.

While the above mentioned devices are suited for their intended usage, none of these devices is designed as an attachment for conventional routers. Further, these devices provide shrouds or housings which obscure the work area from the operator's view. Also, none of the aforesaid devices provide an encircling brush which not only serves to confine the chips and dust produced, but also serves to sweep dust and chips from the surface of the workpiece as the router is advanced therealong. Inasmuch as the art is relatively crowded with respect to these various types of dust removal attachments, it can be appreciated that there is a continuing need for and interest in improvements to such dust removal attachments, and in this respect, the present invention addresses this need and interest.

SUMMARY OF THE INVENTION

In view of the foregoing disadvantages inherent in the known types of dust removal attachments now present in the prior art, the present invention provides an improved dust removal attachment. As such, the general purpose of the present invention, which will be described subsequently in greater detail, is to provide a new and improved dust removal attachment which has all the advantages of the prior art dust removal attachments and none of the disadvantages.

To attain this, representative embodiments of the concepts of the present invention are illustrated in the drawings and make use of a diamond shaped base plate having a central circular aperture and having attaching holes for securing a conventional router to a top surface of the base plate in a position where the spindle of the router extends through the aperture. The present invention also utilizes two brush attachments designed to be alternatively attached to the bottom surface of the base plate. The brush assemblies have upstanding bristles which surround the circular aperture and router spindle and serve to confine chips and dust produced during use. The brush assemblies each make use of a concave body portion which forms a vacuum passage which communicates with a vacuum fitting extending through the top surface of the base plate. The router, when in use, is much more stable owing to the larger area of the base, and the position of a handle on the base plate, opposite the vacuum fitting. This arrangement provides a base plate having a balance superior to prior art router bases. It is preferred that the router base of the present invention is used in conjunction with overhead electrical and vacuum supply connections, thus avoiding impeding the operator with vacuum hoses and electrical cords in the work area.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dust removal attachment which has all the advantages of the prior art dust removal attachments and none of the disadvantages.

It is another object of the present invention to provide a new and improved dust removal attachment which may be easily and efficiently manufactured and marketed.

It is a further object of the present invention to provide a new and improved dust removal attachment which is of a durable and reliable construction.

An even further object of the present invention is to provide a new and improved dust removal attachment which is susceptible of a low cost of manufacture with regard to both materials and labor, and which accordingly is then susceptible of low prices of sale to the consuming public, thereby making such dust removal attachments economically available to the buying public.

Still yet another object of the present invention is to provide a new and improved dust removal attachment which provides in the apparatuses and methods of the prior art some of the advantages thereof, while simultaneously overcoming some of the disadvantages normally associated therewith.

Still another object of the present invention is to provide a new and improved dust removal attachment for a router having a diamond shaped mounting base which serves to balance and stabilize the router during use.

Yet another object of the present invention is to provide a new and improved dust removal attachment for a router which provides a brush for confinement of, and a vacuum fitting for removal of, chips and dust produced during use.

Even still another object of the present invention is to provide a new and improved dust removal attachment for a router which alternatively utilizes two different brush attachments, dependent on the type of operation to be performed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
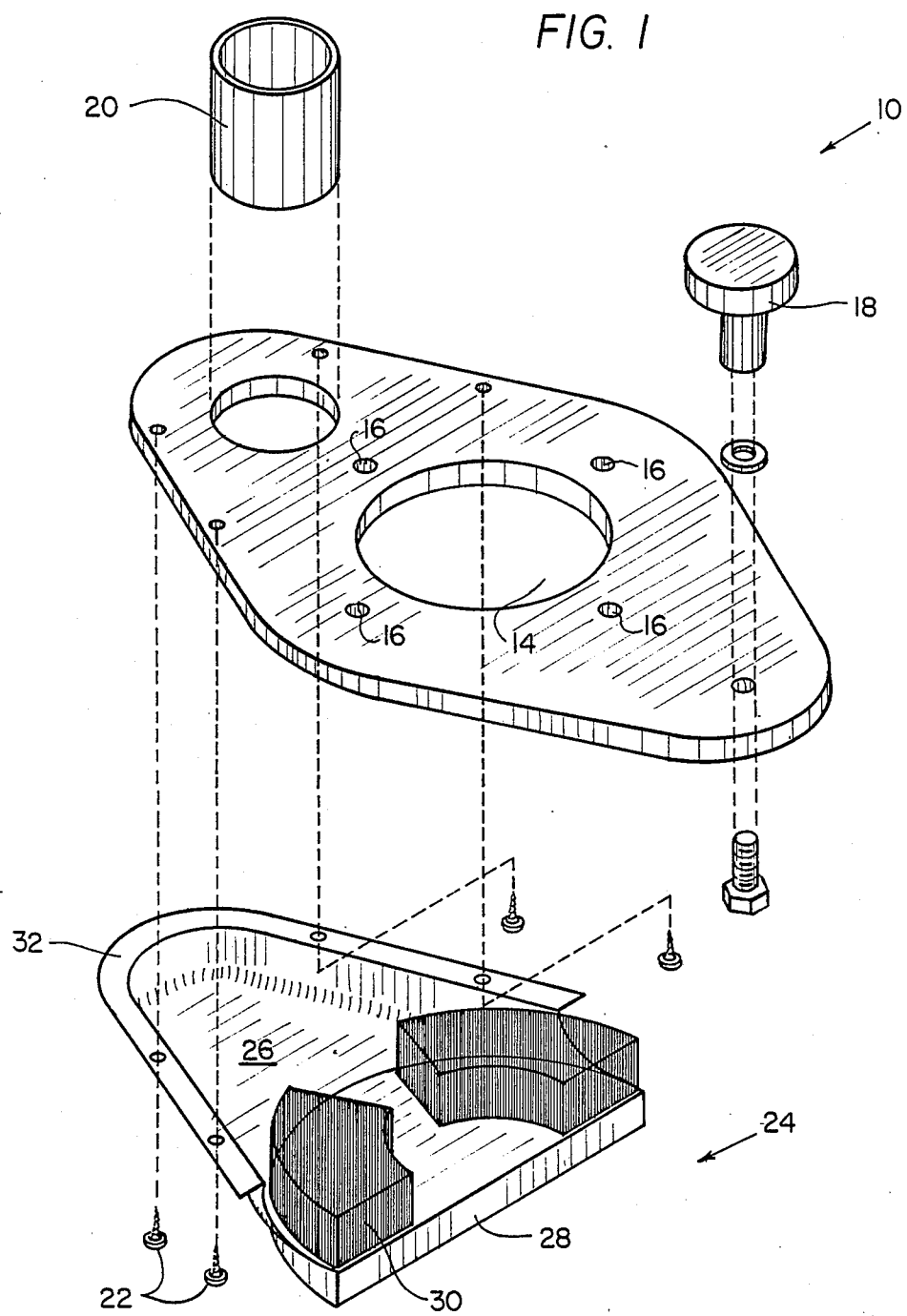
FIG. 1 is an exploded perspective view of a first embodiment of the dust removal attachment of the present invention illustrating the semicircular brush.

With reference now to the drawings, and in particular to FIG. 1 thereof, a new and improved dust removal attachment embodying the principles and concepts of the present invention and generally designated by the reference numeral 10 will be described.

More specifically, it will be noted that the first embodiment 10 of the invention includes a generally diamond shaped base plate 12 having a circular central aperture 14. Four mounting holes 16 are symmetrically arranged about central aperture 14 for mounting a conventional router such that the spindle of the router passes through the center of the aperture. A handle in the form of a knob 18 extends upwardly from the top surface of the base plate 12 at one end thereof. A vacuum connection 20 extends upwardly from an opposite end of base plate 12. Mounting screws 22 extending through base plate 12 cooperate with a mounting flange 32, formed peripherally on a concave body portion 26 of a semicircular brush attachment 24, to secure the brush attachment 24 to the bottom surface of the base plate 12. The concave body portion 26 forms a vacuum passage which communicates with vacuum connection 20. The brush attachment 24 has a semicircular brush portion 28 formed as a semicircular plate which is spaced from, and extends parallel to, base plate 12. A plurality of upstanding bristles 30 are arranged in a semicircular arc on brush portion 28. A gap is left intermediate the extent of this arc for the passage of dust and chips through concave body portion 26 and subsequently, vacuum connection 20. Bristles 30 partially surround the central aperture 14, and in use, the router spindle.

Figure 2:
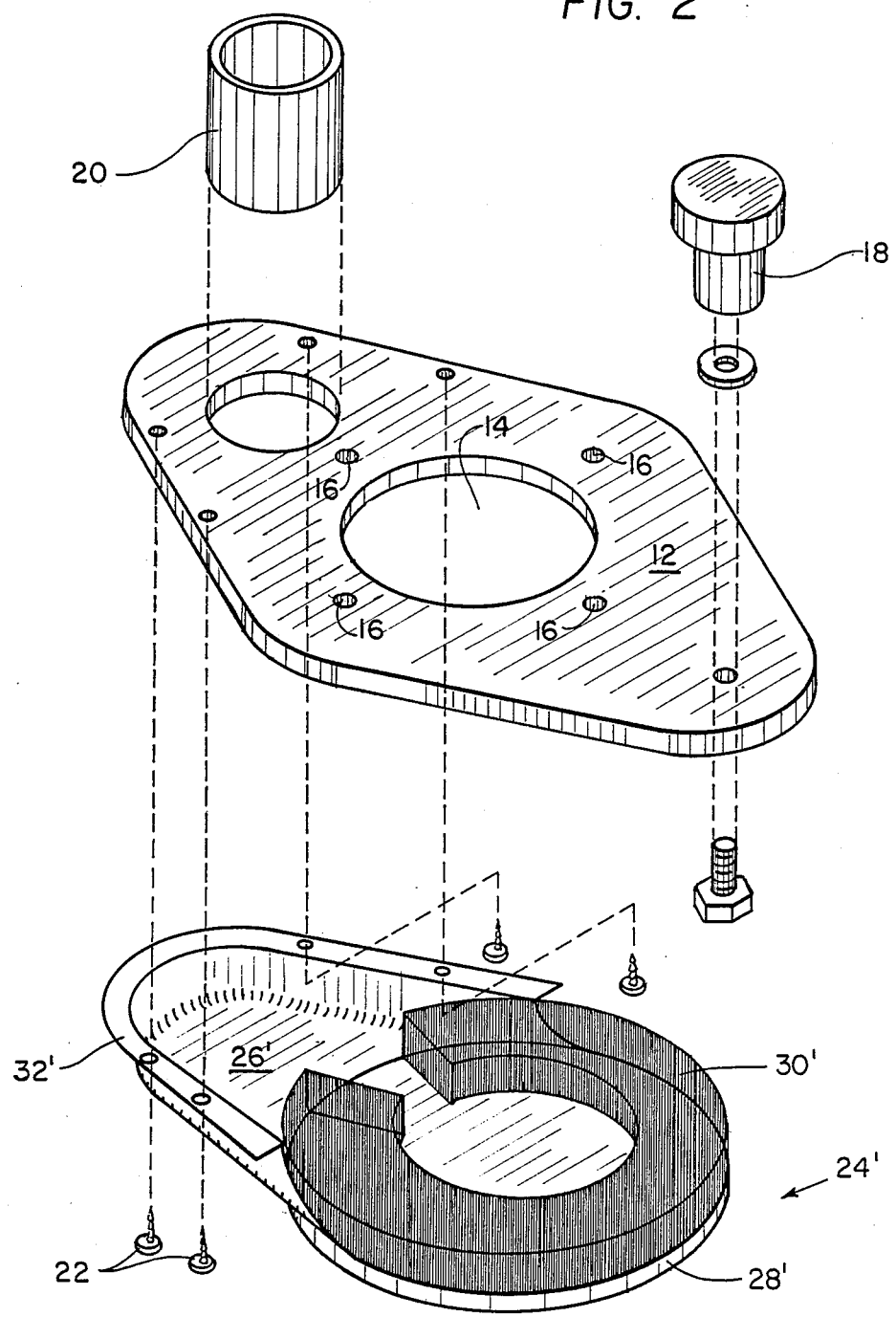
FIG. 2 is a perspective view of the circular brush.

With reference now to FIG. 2, a second circular brush attachment 24' will be described. Circular brush attachment 24' has a concave body portion 26' on which is peripherally formed a mounting flange 32'. A brush portion 28' is in the form of a circular plate. Upstanding bristles 30' are arranged in a circular arc on brush portion 28'. The circular brush attachment 24' is mounted in the same position on the bottom surface of the base plate 12 as the previously described semicircular brush attachment 24 as shown in FIG. 1. Bristles 30' completely surround aperture 14, with the exception of a gap for the passage of dust and chips through the concave body portion 26'.

Figure 3:
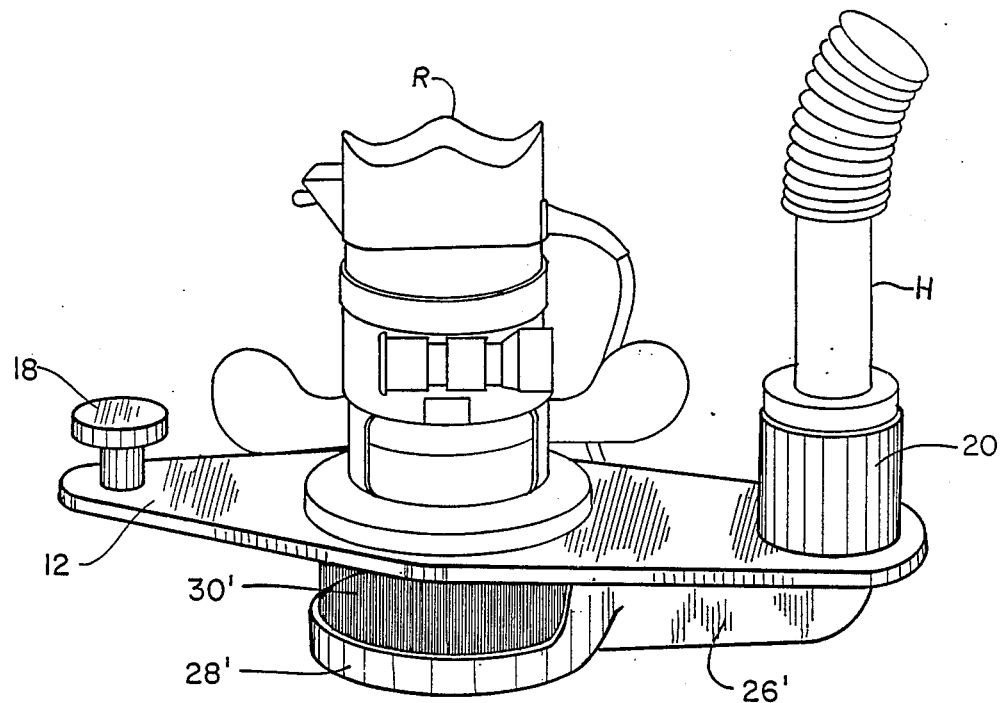
FIG. 3 is an assembled view of the dust removal attachment of the present invention mounted on a conventional router.

In the usage of the dust removal attachment of the present invention, a conventional router is first attached to the top surface of the base plate 12 utilizing mounting holes 16, as shown in FIG. 3. Then, depending on the intended operation to be performed, either the semicircular brush attachment 24 or the circular brush attachment 24' is attached to the bottom surface of the base plate 12 via mounting flange 32,32' and screws 22. A vacuum source is then connected to vacuum connection 20 via a hose H, and the router is manipulated to perform the desired operation through handle 18 and the conventional handles formed on the router. The position of handle 18 at the end of the elongated base plate 12 serves to provide a lever arm whereby the router may be balanced and stabilized by a minimum of operator effort. Dust and chips formed during the operation are contained by the bristles 30,30' surrounding the router spindle and are suctioned off through the vacuum passage formed in the concave body portion 26,26'. As previously mentioned, the choice between the semicircular brush attachment 24 and the circular brush attachment 24' depends on the intended operation to be performed. In a "roundover" operation the semicircular brush 24 is utilized to allow work piece clearance. In a "kerfing" or edge trimming operation of thin materials, the circular brush 24' is utilized to provide the maximum containment of the dust and chips. In both cases, the brushes serve also to sweep dust and chips from the surface of the workpiece.

The base plate 12 and brush attachments 24,24' are preferably formed from a phenolic plastic resin, though many other materials may be utilized. Bristles 30,30' may be formed on separate supports and then affixed to brush portions 28,28'.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dust removal attachment for a router, comprising:
   base plate means having top and bottom surfaces;
   aperture means extending through said base plate means;
   means for mounting a router on said base plate means so that a spindle of the router extends through said aperture means;
   vacuum passage means formed through said base plate means;
   vacuum connection means on said top surface of said base plate means for connecting said vacuum passage means with a source of vacuum;
   brush means mounted on said bottom surface of said base plate means;
   said brush means having an elongated concave body portion forming a chamber connected with said vacuum passage means;
   a planar surface, which extends parallel to, and spaced from, said bottom surface of said base plate means, connected to one end of said elongated concave body portion;
   a plurality of bristles, arranged in a partial circular arc around said aperture means, extending upwardly from said planar surface; and
   a gap formed intermediate said bristles creating a passage through said bristles whereby dust and chips formed by a router bit extending through said aperture means in said base plate means are drawn through said gap and out said vacuum connection means.

2. The dust removal attachment of claim 1, further comprising handle means on said top surface of said base plate means.

3. The dust removal attachment of claim 1, further comprising mounting flange means formed on said concave body portion of said brush means and a plurality of threaded fasteners connecting said mounting flange to said bottom surface of said base plate means.

4. The dust removal attachment of claim 1, wherein said planar surface comprises a semicircular plate and said bristles extend upwardly in a semicircular arc around a periphery of said plate.

5. The dust removal attachment of claim 1, wherein said planar surface comprises a circular plate and said bristles extend upwardly in a circular arc around a periphery of said plate.

6. The dust removal attachment of claim 1, wherein said base plate means comprises a generally diamond shaped plate having a circular central aperture.

7. The dust removal attachment of claim 6, wherein said vacuum connection means comprises an upwardly extending pipe at one end of said diamond shaped base plate and handle means at an opposite end of said diamond shaped base plate.

8. The dust removal attachment of claim 6, wherein said planar surface comprises a semicircular plate and said bristles extend upwardly in a semicircular arc around a periphery of said plate.

9. The dust removal attachment of claim 6, wherein said planar surface comprises a circular plate and said bristles extend upwardly in a circular arc around a periphery of said plate.

10. A dust removal attachment for a router, comprising:
    a generally planar diamond shaped base plate means having top and bottom surfaces;
    a circular aperture extending centrally through said diamond shaped base plate means;
    means for mounting a router on said top surface of said diamond shaped base plate means so that a spindle of the router extends through said central circular aperture;
    vacuum passage means extending through one end of said diamond shaped base plate means;

vacuum connecting means on said top surface of said diamond shaped base plate means for connecting said vacuum passage means with a source of vacuum;

a handle means extending upwardly from said top surface of said diamond shaped base plate means at and end opposite said vacuum passage means;

brush means mounted on said bottom surface of said diamond shaped base plate means;

said brush means having an elongated concave body portion with a peripheral mounting flange;

a planar surface, which extends parallel to, and spaced from, said bottom surface of said diamond shaped base plate means, connected to one end of said elongated concave body portion;

a plurality of bristles arranged in a partial circular arc extending upwardly from said planar surface and at least partially surrounding said central circular aperture; and a gap formed intermediate said bristles creating a passage through said bristles whereby dust and chips formed by a router bit connected to a spindle of a router extending through said central circular aperture in said diamond shaped base plate means are drawn through said gap and out said vacuum connection means.

11. The dust removal attachment of claim 10, wherein said planar surface comprises a semicircular plate and said bristles extend upwardly in a semicircular arc around a periphery of said plate.

12. The dust removal attachment of claim 10, wherein said planar surface comprises a circular plate and said bristles extend upwardly in a circular arc around a periphery of said plate.

* * * * *